US009613298B2

(12) United States Patent
Guzmán-Rivera et al.

(10) Patent No.: US 9,613,298 B2
(45) Date of Patent: Apr. 4, 2017

(54) TRACKING USING SENSOR DATA

(71) Applicant: Microsoft Technology Licensing, LLC, Redmond, WA (US)

(72) Inventors: Abner Guzmán-Rivera, Chicago, IL (US); Pushmeet Kohli, Cambridge (GB); Benjamin Michael Glocker, Cambridge (GB); Jamie Daniel Joseph Shotton, Cambridge (GB); Shahram Izadi, Cambridge (GB); Toby Sharp, Cambridge (GB); Andrew William Fitzgibbon, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 234 days.

(21) Appl. No.: 14/293,855

(22) Filed: Jun. 2, 2014

(65) Prior Publication Data
US 2015/0347846 A1 Dec. 3, 2015

(51) Int. Cl.
*G06K 9/62* (2006.01)
*G06K 9/00* (2006.01)

(52) U.S. Cl.
CPC ......... *G06K 9/6256* (2013.01); *G06K 9/6282* (2013.01); *G06K 9/00389* (2013.01); *G06K 9/00664* (2013.01)

(58) Field of Classification Search
CPC ............. G06K 9/00624; G06K 9/6218; G06K 9/6256; G06K 9/627; G06T 17/00
See application file for complete search history.

(56) References Cited

U.S. PATENT DOCUMENTS

| | | | |
|---|---|---|---|
| 8,229,221 B2 | 7/2012 | Le Roux et al. | |
| 2001/0043738 A1 | 11/2001 | Sawhney et al. | |
| 2012/0194516 A1 | 8/2012 | Newcombe et al. | |
| 2012/0194644 A1 | 8/2012 | Newcombe et al. | |
| 2012/0196679 A1 | 8/2012 | Newcombe et al. | |
| 2013/0129230 A1* | 5/2013 | Shotton ................ | G06T 7/0046 382/218 |
| 2013/0163853 A1 | 6/2013 | Kwak et al. | |

(Continued)

OTHER PUBLICATIONS

Hofmann, et al., "Multi-view 3D Human Pose Estimation in Complex Environment", In International Journal of Computer Vision, vol. 96, No. 1, Jan. 1, 2012, pp. 103-124.

(Continued)

*Primary Examiner* — Tom Y Lu
(74) *Attorney, Agent, or Firm* — Lee & Hayes, PLLC

(57) ABSTRACT

Tracking using sensor data is described, for example, where a plurality of machine learning predictors are used to predict a plurality of complementary, or diverse, parameter values of a process describing how the sensor data arises. In various examples a selector selects which of the predicted values are to be used, for example, to control a computing device. In some examples the tracked parameter values are pose of a moving camera or pose of an object moving in the field of view of a static camera; in some examples the tracked parameter values are of a 3D model of a hand or other articulated or deformable entity. The machine learning predictors have been trained in series, with training examples being reweighted after training an individual predictor, to favor training examples on which the set of predictors already trained performs poorly.

20 Claims, 11 Drawing Sheets

(56) References Cited

U.S. PATENT DOCUMENTS

| | | |
|---|---|---|
| 2013/0343619 A1 | 12/2013 | Criminisi et al. |
| 2013/0346346 A1 | 12/2013 | Criminisi et al. |
| 2014/0002597 A1 | 1/2014 | Taguchi et al. |

OTHER PUBLICATIONS

Li, et al., "A Generative/Discriminative Learning Algorithm for Image Classification", In Proceedings of IEEE International Conference on Computer Vision, vol. II, Oct. 17, 2005, 8 pages.

Xu, et al., "Efficient Hand Pose Estimation from a Single Depth Image", In IEEE International Conference on Computer Vision, Dec. 2013, 7 pages.

Jaramillo, et al., "6-DoF Pose Localization in 3D Point-Cloud Dense Maps Using a Monocular Camera", In Proceeding of the IEEE International Conference on Robotics and Biomimetics, Dec. 2013, pp. 1747-1752.

Li, et al.,"Hybrid Generative-Discriminative Classification using Posterior Divergence", In IEEE Conference on Computer Vision and Pattern Recognition, Jun. 21, 2011, pp. 2713-2720.

Fallon, et al., "Efficient Scene Simulation for Robust Monte Carlo Localization using an RGB-D Camera", In IEEE International Conference on Robotics and Automation, May 14, 2012, 8 pages.

Sim, et al., "Learning Generative Models of Invariant Features", In Proceedings of International Conference on Intelligent Robots and Systems, Sep. 29, 2004, 8 pages.

Gemeiner, et al., "Improving Localization Robustness in Monocular SLAM Using a High-Speed Cam", In proceedings of Robotics: Science and Systems IV, Jun. 2008, 8 pages.

Straub, et al., "Fast Relocalization for Visual Odometry Using Binary Features", In proceeding of: IEEE International Conference on Image Processing, Jan. 2013, 5 pages.

U.S. Appl. No. 13/860,515, Kohl!, et al., "Image Labeling Using Geodesic Features", filed Apr. 10, 2013.

Agarwal, et al., "Building Rome in a Day", In Proceedings of Twelfth IEEE International Conference on Computer Vision, Sep. 2009, 8 pages.

Alexa, Marc, et al., "Linear Combination of Transformations", In Proceedings of the 29th Annual Conference on Computer Graphics and Interactive Techniques, Jul. 23, 2002, pp. 380-387.

Atiya, et al., "Real-time Vision-based Robot Localization", In proceedings of IEEE Transactions on Robotics and Automation, vol. 9, Issue 6, Dec. 1993, pp. 785-800.

Batra, et al., "Diverse m-best solutions in markov random fields", In Proceedings of the 12th European conference on Computer Vision—vol. Part V, Oct. 7, 2012, 30 pages.

Brubaker, et al., "Lost! Leveraging the Crowd for Probabilistic Visual Self-Localization", In IEEE Conference on Computer Vision and Pattern Recognition, Jun. 23, 2013, 8 pages.

Bylow, et al., "Realtime Camera Tracking and 3d Reconstruction Using Signed Distance Functions", In Proceedings of Robotics: Science and Systems, Jun. 24, 2013, 8 pages.

Curless, et al., "A Volumetric Method for Building Complex Models from Range Images", In Proceedings of the 23rd Annual Conference on Computer Graphics and Interactive Techniques, Aug. 1, 1996, pp. 303-312.

Davison, et al., "MonoSLAM: Real-time Single Camera SLAM", In Proceedings of IEEE Transactions on Pattern Analysis and Machine Intelligence, vol. 29, No. 6, Jun. 2007, pp. 1052-1067.

Dekel, et al., "There's a Hole in my Data Space: Piecewise Predictors for Heterogeneous Learning Problems", In Proceedings of the 15th International Conference on Artificial Intelligence and Statistics, Apr. 21, 2012, pp. 291-298.

Desouza, et al., "Vision for Mobile Robot Navigation: A Survey", In Journal of IEEE Transactions on Pattern Analysis and Machine Intelligence, vol. 24, No. 2, Feb. 2002, pp. 237-267.

Gu, et al., "Clustered Support Vector Machines", In Proceedings of the 16th International Conference on Artificial Intelligence and Statistics, Apr. 29, 2013, pp. 307-315.

Guzman-Rivera, et al., "Multiple Choice Learning: Learning to Produce Multiple Structured Outputs", In Proceedings of 26th Annual Conference on Neural Information Processing Systems, Dec. 3, 2012, pp. 1-9.

Klein, et al., "Improving the Agility of Keyframe-based SLAM", In Proceedings of 10th European Conference on Computer Vision, Oct. 12, 2008, pp. 1-14.

Kulesza, et al., "Determinantal Point Processes for Machine Learning", In Proceedings of Foundations and Trends in Machine Learning, vol. 5, No. 2-3, Apr. 2012, pp. 1-120.

Lepetit, et al., "Keypoint Recognition using Randomized Trees", In Journal of IEEE Transactions on Pattern Analysis and Machine Intelligence, vol. 28, Issue 9, Sep. 2006, 29 pages.

Newcombe, et al., "KinectFusion: Real-time Dense Surface Mapping and Tracking", In Proceedings of the 10th IEEE International Symposium on Mixed and Augmented Reality, Oct. 26, 2011, 10 pages.

Salas-Moreno, et al., "Slam++: Simultaneous Localisation and Mapping at the Level of Objects", In Proceedings of IEEE Conference on Computer Vision and Pattern Recognition, Jun. 23, 2013, pp. 1352-1359.

Se, et al., "Vision-based Global Localization and Mapping for Mobile Robots", In Proceedings of IEEE Transaction on Robotics, vol. 21, Issue 3, Jun. 2005, pp. 364-375.

Shotton, et al., "Scene Coordinate Regression Forests for Camera Relocalization in RGB-D Images", In Proceedings of the IEEE Conference on Computer Vision and Pattern Recognition, Jun. 2013, pp. 2930-2937.

Williams, et al., "Automatic Relocalization and Loop Closing for Real-time Monocular SLAM", In Proceedings of IEEE Transactions on Pattern Analysis and Machine Intelligence, vol. 33, Issue 9, Sep. 2011, pp. 1-15.

Yang, et al., "Articulated Pose Estimation with Flexible Mixtures-of-Parts", In Proceedings of the IEEE Conference on Computer Vision and Pattern Recognition, Jun. 2011, pp. 1385-1392.

Sharp, et al. "Camera Pose Estimation for 3D Reconstruction", U.S. Appl. No. 13/749,497, filed Jan. 24, 2013.

Norouzi, M. et al. "Non greedy machine learning for high accuracy" U.S. Appl. No. 14/259,117, filed Apr. 22, 2014.

\* cited by examiner

TRACKING USING SENSOR DATA

BACKGROUND

There are many situations where sensor data is used for tracking changes between an environment and a sensor in the environment. For example, to track pose of a camera which is moving through the environment on a robot or vehicle, or to track pose of an object moving in the field of view of a static camera. Sensors for monitoring environmental conditions such as temperature, humidity, wind speed, light levels, sound, and other conditions may also be used to track changes in those conditions. Many other types of sensors are known and may be used to track changes in physical conditions. The tracked changes are typically used for controlling equipment such as robots, computing devices, mechanical equipment and others. As a result, accuracy and speed of tracking is important. It is also important to be able to detect tracking errors and to be able to recover from those. For example, a tracking system on a moving robot may lose track of its pose as a result of sudden changes in its motion, changes in the environment such as a person walking in front of the camera, or for other reasons.

Some approaches to tracking using sensor data make use of a process describing how the sensed data is generated. For example, a carbon cycle process which may be used to explain or predict temperature changes; or a calendar process which may be used to explain changes in outdoor light levels over days and months. In the case of tracking pose of a moving camera, the process may be a rendering process which uses a current pose of the camera and a 3D model of the camera's environment to render an image that can "explain" an empirically observed image at the camera. Typically the process for describing how the sensed data is generated is specified mathematically and comprises a plurality of parameters whose values change over time and are to be tracked. Tracking using sensor data may comprise using the sensed data to repeatedly compute values of parameters of a generative process describing how the sensed data occurs.

Previous approaches to computing values of parameters of these types of generative processes have involved computing minimizations which involve searching over very large numbers of possible parameter values. The minimizations are time consuming and complex to compute and take up valuable computing resources. Once a solution to a minimization is computed it may be that the solution is a local solution rather than the best global solution. This is problematic as the accuracy of tracking is then reduced. For example, computing a minimization often comprises selecting a starting point and then making a gradient descent type search to find a minimum. Selecting a good starting point is often difficult, especially where there is no good solution to use from a previous situation (such as a previous frame of a video stream, or a previous segment of a stream of measurements). Selecting a poor starting point may result in finding a local minimum which is inaccurate compared with the global minimum.

The embodiments described below are not limited to implementations which solve any or all of the disadvantages of known systems for tracking using sensor data.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Tracking using sensor data is described, for example, where a plurality of machine learning predictors are used to predict a plurality of complementary, or diverse, parameter values of a process describing how the sensor data arises. In various examples a selector selects which of the predicted values are to be used, for example, to control a computing device. In some examples the tracked parameter values are pose of a moving camera or pose of an object moving in the field of view of a static camera; in some examples the tracked parameter values are of a 3D model of a hand or other articulated or deformable entity. The machine learning predictors have been trained in series, with training examples being reweighted after training an individual predictor, to favor training examples on which the set of previously trained predictors performs poorly.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
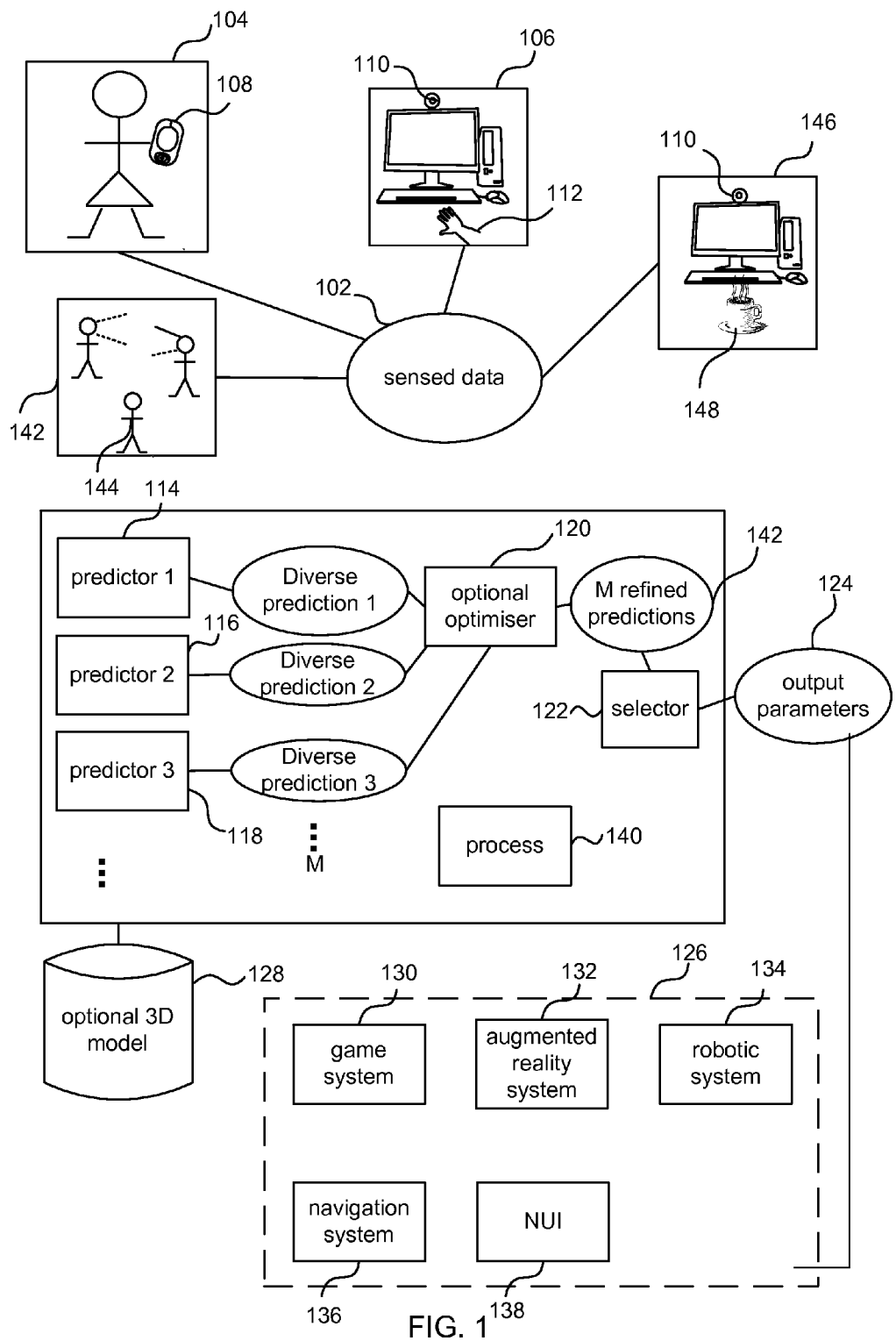
FIG. 1 is a schematic diagram of a tracker which takes sensed data as input and which outputs parameters of a process to a computing device such as a game system, augmented reality system, robotic system, navigation system or natural user interface.

FIG. 1 is a schematic diagram of a tracker 100 which takes sensed data 102 as input and which outputs parameters 124 of a process 140 to a computing device 126 such as a game system 130, augmented reality system 132, robotic system 134, navigation system 136 or natural user interface 138.

The sensed data 102 input to the tracker 100 depends on the application domain or task involved. For example, the sensed data may be audio input from one or more microphones in an environment, images such as color images, depth images, stereo images, medical images or other images from an image capture device, or sensed data from other types of sensors such as light sensors, temperature sensors, humidity sensors, gyroscopes, compasses, GPS sensors and others.

In an example a person may be walking in an environment 104 and holding a camera phone 108. The camera phone may capture a video of the environment 104 and the video frames are input as sensed data 102 to tracker 100 in order to track and/or relocalize pose of the camera phone 108. Relocalization comprises computing pose of the camera phone 108 from scratch, that is, without simply updating pose of the camera phone from an earlier video frame. The pose of the camera phone (a six degree of freedom parameter) enables downstream systems such as at computing device 126 to know position and orientation of the camera phone in world space. Computing device 126 may be controlled using the tracked camera pose to enable a variety of applications including but not limited to augmented reality, games, navigation, natural user interface. In this example, the camera is moving.

In an example, a person is using a desktop computing arrangement 106 with a keyboard and a computer screen. An image capture device 110 is able to capture images of a user's hand 112 in an interaction volume over the keyboard. The sensed data 102 comprises images from image capture device 110. The tracker may track parameters of a 3D model of the user's hand in order to enable fine scale gesture recognition at a game system 130, natural user interface 138, augmented reality system 132 or other system. In this example, the camera (image capture device 110) is static and the object (person's hand) is moving. The person's hand is an example of an articulated entity and is also an example of a deformable object.

In another example shown at 146 in FIG. 1, a rigid object, such as a mug 148, is rotated in front of image capture device 110. Images from the image capture device 110 may be input to tracker 100 to track pose of the mug 148.

In an example, a plurality of people 144 are in a room 142 and are speaking. One or more microphones in the room sense the sounds of the speech the resulting audio stream is the sensed data 102 input to tracker 100. In this example, tracker 100 tracks parameters of a process 140 describing how the audio stream is generated. The parameters may comprise a number of people in the room. In this case the tracker 100 tracks the number of people in the room.

The tracker is computer implemented using software and/or hardware. It comprises a plurality of predictors 114, 116, 118 of the same or different types. Each predictor is a machine learning system which has been trained using labeled training data as described in more detail below. The predictors are trained to predict data for calculating values of parameters of a process 140 describing how the sensed data 102 arises. In the example of FIG. 1 three predictors 114, 116, 118 are illustrated although it is possible to use two or more predictors. The number of predictors used may be selected according to the application domain.

The predictors are trained to make predictions which are complementary to one another, that is, which are diverse from one another. The predictions are dispersed over a space of possible predictions, but are still good predictions. In various examples, second parameter values predicted by a second machine learning predictor are predicted so as to be diverse from first parameter values predicted by a first machine learning predictor; and third parameter values predicted by a third machine learning predictor are predicted so as to be diverse from the first and second parameter values. In examples the predictors are trained to make predictions such that the lowest error achieved by any of the trained machine learning systems on a given sensor data portion is minimized.

An optional optimizer 120 may take the predictions of the multiple predictors and use those as starting points of a minimization process. The minimization process acts to refine the predictions. The minimization process produces one refined prediction per predictor. For example, if there are M predictors then optimizer 120 produces M refined predictions 142 which are input to selector 122. Any suitable minimization process may be used such as gradient descent, simulated annealing, or others.

In some examples, the optional optimizer 120 computes a pose refinement, where the predictors act to predict values for computing camera or object pose. A pose refinement process is one which improves the accuracy of the camera/object pose. The pose refinement process may be an iterative closest point pose refinement as described in US patent application "Real-time camera tracking using depth maps" Newcombe, Richard et al. published on Aug. 2, 2012 US20120196679. In another example the pose refinement process may seek to align observations from a camera with surfaces of a 3D model of the scene in order to find an updated position and orientation of the camera/object which facilitates the alignment. This is described in U.S. patent application Ser. No. 13/749,497 filed on 24 Jan. 2013 entitled "Camera pose estimation for 3D reconstruction" Sharp et al.

In the camera pose tracking case, the predictors may be trained to predict scene coordinates which may then be used to calculate camera pose parameters. The camera pose parameters are parameters of a process whereby the sensed data (an image of a scene) is generated from a 3D model of the scene.

A selector 122 selects amongst the predictions of the multiple predictors. In the case that an optional optimizer is used the selector selects amongst refined versions of the predictions of the multiple predictors. More detail about the selector is given later in this document. The selector may use an aggregation or clustering process in some examples. The selected parameter values are the output parameters 124 which may be sent to a downstream system at computing device 126.

The results are more accurate than previous systems and may be computed quickly at test time, especially where parallelization is used for the machine learning predictors. For example, using individual threads for individual predictors, at a parallel computing unit such as a GPU, a multi-core computing device or other parallel computing unit.

In some examples the tracker has access to a 3D model 128 of a scene or object such as a scene reconstruction of an environment 104 in which the user with his or her camera phone is moving, a 3D model of a hand 112, and a 3D model of a mug 148. For example the 3D model may be a CAD model or may be a dense reconstruction of the scene built up from depth images of the scene as described in US patent application "Three-dimensional environment reconstruction" Newcombe, Richard et al. published on Aug. 2, 2012 US20120194516.

Alternatively, or in addition, the functionality of the tracker described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 2:
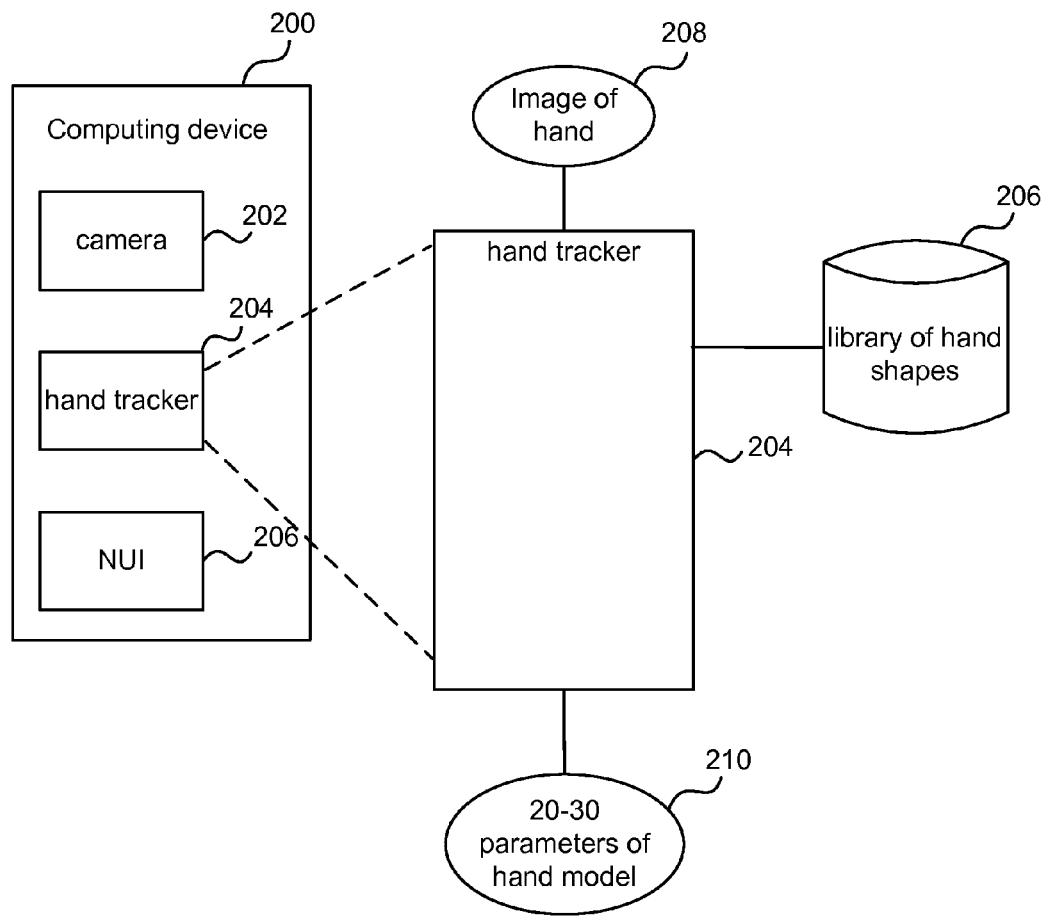
FIG. 2 is a schematic diagram of a hand tracker in the case where the tracker of FIG. 1 is a hand tracker.

More detail about the hand tracking scenario illustrated at 106 of FIG. 1 is now given with reference to FIG. 2. In this example a computing device 200, such as a desktop computer deployment, has a camera 202, a hand tracker 204, and a natural user interface 206. The camera captures a stream of images of the user's hand 208. The images may be RGB images, depth images, pairs of RGB and depth images, or other images. The hand tracker 204 is an example of the tracker 100 of FIG. 1 and so it comprises a plurality of predictors each trained to predict diverse values of parameters of a 3D hand model. For example, the 3D hand model may comprise 20 to 30 parameters specifying lengths of various bones in the hand, pose of the hand and other details. The predicted parameter values may be used to select hand shapes from a library of hand shapes 206. These hand shapes are then assessed by comparing them to the input images to find a hand shape which has a best fit to the input images. By using a plurality of predictors which predict diverse starting points (in this case diverse potential hand shapes from the library) greater accuracy is achieved as compared with previous systems which tend to select a wrong hand shape candidate in certain circumstances (i.e. become stuck in local minima which are incorrect solutions).

Figure 3:
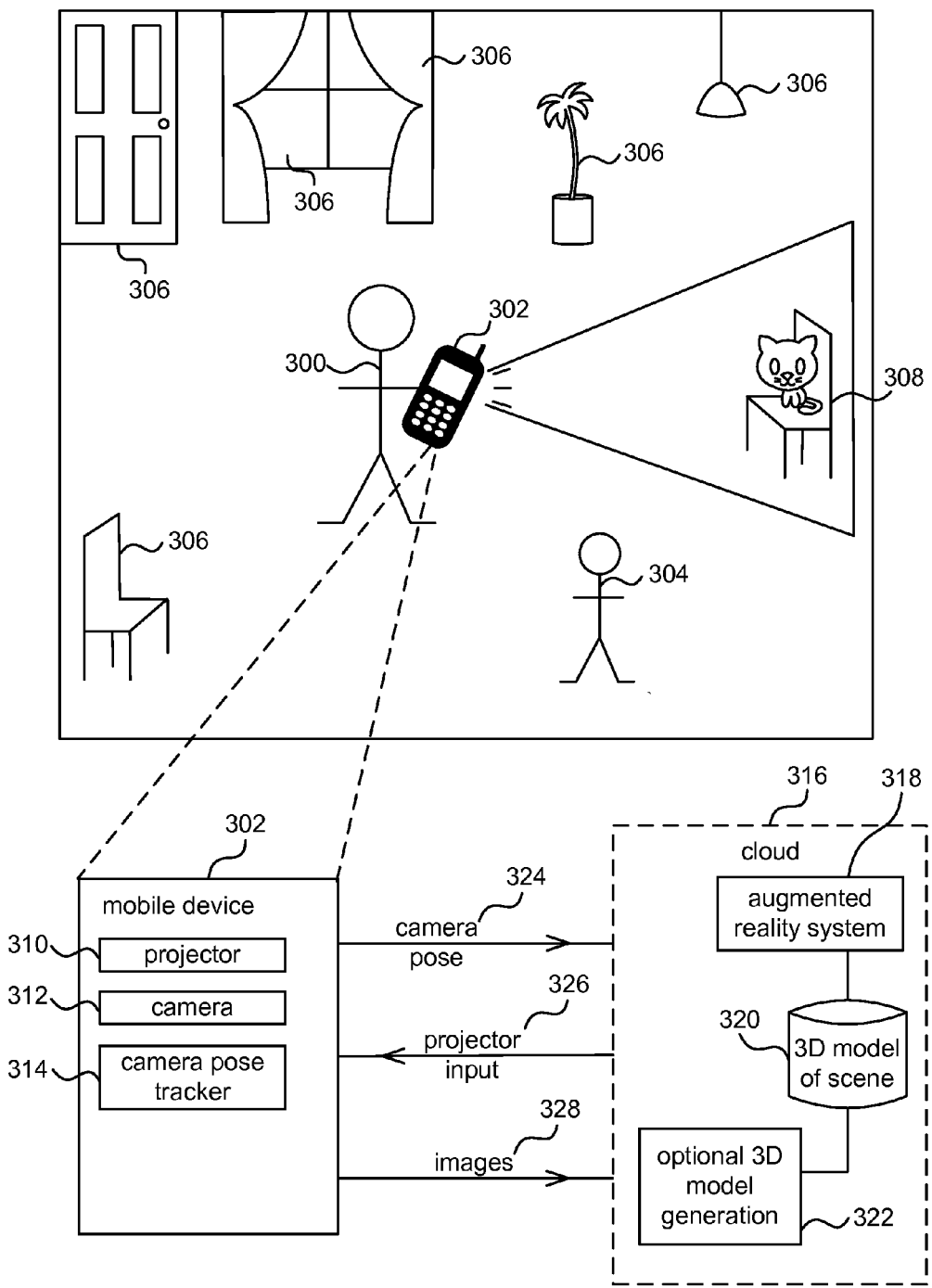
FIG. 3 is a schematic diagram of a person holding a mobile device with a camera and a camera pose tracker and which communicates with an augmented reality system to enable an image of a cat to be projected into the scene in a realistic manner.

FIG. 3 is a schematic diagram of a person holding a mobile device with a camera and a camera pose tracker and which communicates with an augmented reality system to enable an image of a cat to be projected into the scene in a realistic manner. A person 300 is holding a mobile device 302 which has a camera 312, a camera pose tracker 314 and a projector 310. For example, the mobile device may be a smart phone. Other components of the mobile device to enable it to function as a smart phone such as a communications interface, display screen, power source and other components are not shown for clarity. A person 300 holding the mobile device 302 is able to capture images of the scene or environment in which the user is moving. In the example of FIG. 3 the scene or environment is a living room containing various objects 306 and another person 304.

The mobile device is able to communicate with one or more entities provided in the cloud 316 such as an augmented reality system 318, a 3D model of the scene 320 and an optional 3D model generation system 322.

For example, the user 300 operates the mobile device 302 to capture images of the scene which are used by the camera pose tracker 314 to compute the pose (position and orientation) of the camera. At the consent of the user, the camera pose is sent 324 to the entities in the cloud 316 optionally with the images 328. The augmented reality system 318 may have access to a 3D model of the scene 320 (for example, a 3D model of the living room) and may use the 3D model and the camera pose to calculate projector input 326. The projector input 326 is sent to the mobile device 302 and may be projected by the projector 310 into the scene. For example, an image of a cat 308 may be projected into the scene in a realistic manner taking into account the 3D model of the scene and the camera pose. The 3D model of the scene could be a computer aided design (CAD) model, or could be a model of the surfaces in the scene built up from images captured of the scene using a 3D model generation system 322. An example of a 3D model generation system which may be used is described in US patent application "Three-Dimensional Environment Reconstruction" Newcombe, Richard et al. published on Aug. 2, 2012 US20120194516. Other types of 3D model and 3D model generation systems may also be used.

Figure 4:
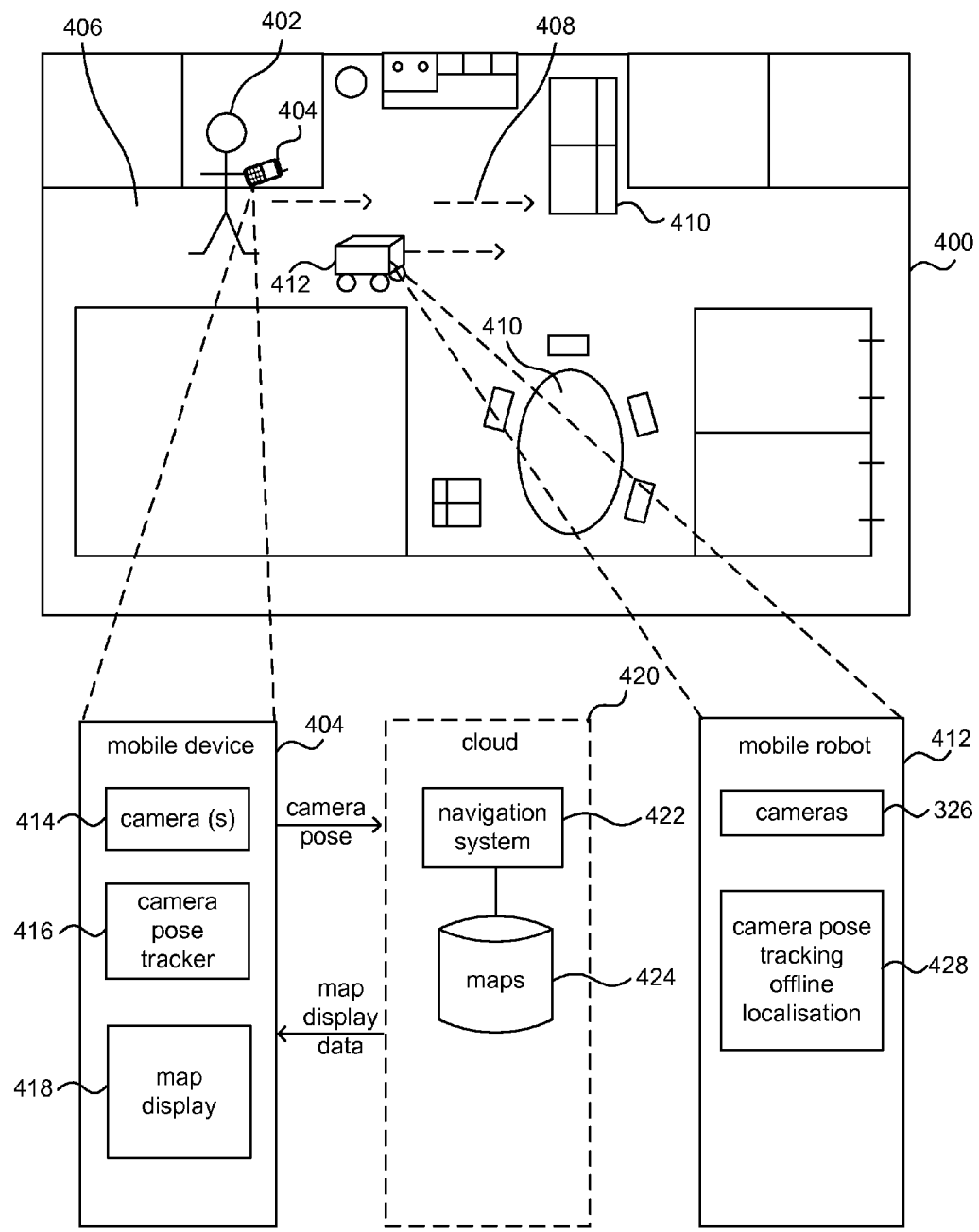
FIG. 4 is a schematic diagram of a person and a robot each with a camera and a camera pose tracker.

An example where the downstream system is a navigation system is now described with reference to FIG. 4. FIG. 4 has a plan view of a floor of an office 400 with various objects 410. A person 402 holding a mobile device 404 is walking along a corridor 406 in the direction of arrows 408. The mobile device 404 has one or more cameras 414, a camera pose tracker 416 and a map display 418. The mobile device 404 may be a smart phone or other mobile communications device as described with reference to FIG. 3 and which is able to communicate with a navigation system 422 in the cloud 420. The navigation system 422 receives the camera pose from the mobile device (where the user has consented to the disclosure of this information) and uses that information together with maps 424 of the floor of the office to calculate map display data to aid the person 402 in navigating the office floor. The map display data is sent to the mobile device and may be displayed at map display 418.

An example where the downstream system is a robotic system is now described with reference to FIG. 4. A robot vehicle 412 moves along the corridor 406 and captures images using one or more cameras 426 on the robot vehicle. A camera pose tracker 428 at the robot vehicle is able to calculate pose of the camera(s) where the scene is already known to the robot vehicle.

Figure 5:
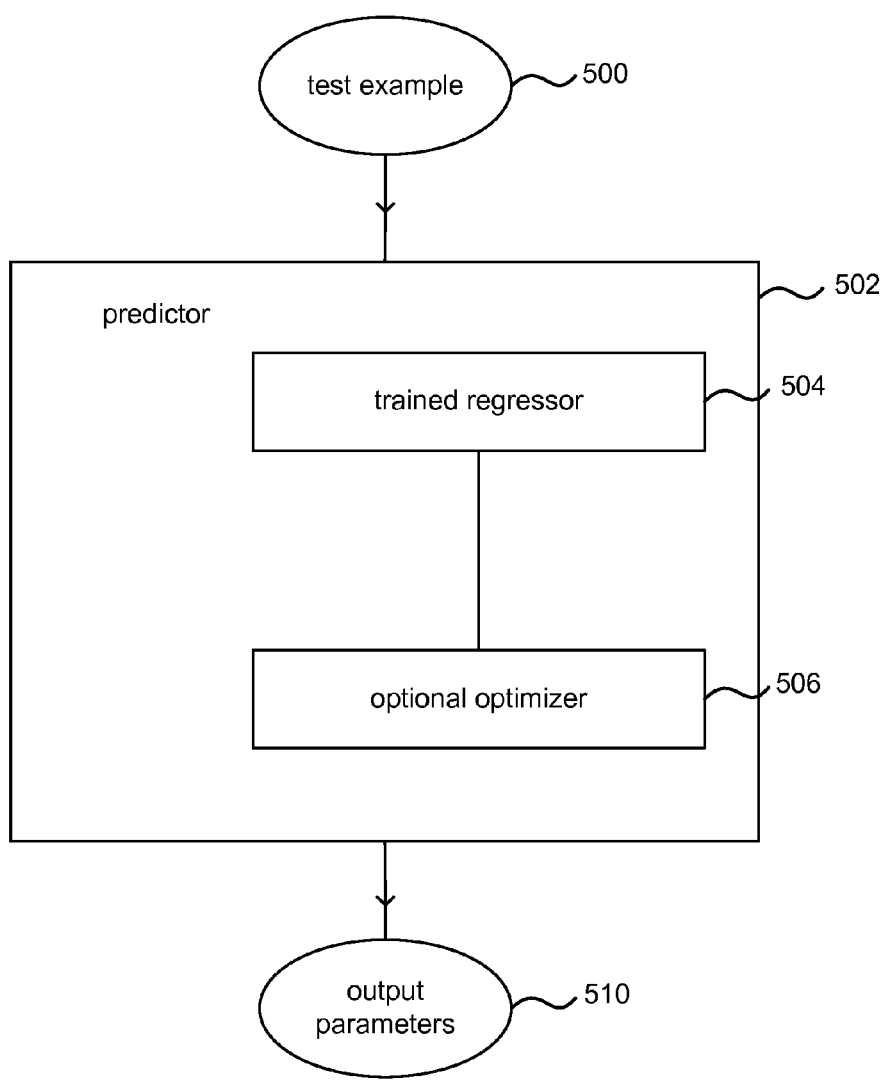
FIG. 5 is a flow diagram of a method at a machine learning predictor at test time.

FIG. 5 is a flow diagram of a method at a machine learning predictor at test time. This method may be implemented at any of the predictors of FIG. 1. A test example 500 is received at the predictor 502. The predictor is computer implemented using software and/or hardware and comprises a trained regressor such as a support vector machine, random decision forest, Gaussian process regression system, random decision forest, neural network. Using the test example 500 the trained regressor 504 predicts one or more values of parameters of a process describing how the example was generated. The predicted parameter values may be used as a starting point for optimization using optional optimizer 506. The predictor 502 outputs parameters 510 which are the result of the optimizer used. The parameters 510 are optionally refined and are input to selector 122 as described above with reference to FIG. 1. More detail about the selector 122 of FIG. 1 is given later in this document.

The selector 122 may select amongst the outputs of multiple predictors on the basis of a reconstruction or rendering of each prediction and a reconstruction error, which compares the reconstruction with the input data.

In an example where the task involves tracking pose of a camera, object, articulated entity, or deformable entity, a task loss may be expressed using a reconstruction error. A reconstruction error is a measure of the distance between an observed image and an image rendered from a 3D model of the scene or object/entity using the tracked pose. In an example, the task is a camera-pose estimation task. This task aims to find a camera pose H* associated with a view of a scene (generated from a 3D model of the scene) which is most similar to an input frame I (from the camera). The aim may be expressed as:

$$H^* = \underset{H}{\operatorname{argmin}} \Delta_\varepsilon(I, R(H;\mathbb{M}))$$

Which may be expressed in words as, an optimal set of parameters of six degree of freedom pose of a camera in world space is equal to the minimum, over possible values of the camera pose parameters, of a reconstruction error which is a distance between an image of the scene captured by the camera and an image rendered by a rendering function R given the camera pose parameters H and a 3D model of the scene $\mathbb{M}$. An example of a distance function is an L1 norm on the difference of depth values in the input (depth) image and rendered depth. The symbol $\varepsilon$ denotes a choice of metric for measuring the reconstruction error.

For example, an L1 norm, may be calculated as follows:

$$\Delta_{L1}(I,R(H;\mathbb{M}))=\Sigma_i|D_{input}(i)-D_H(i)|$$

Which may be expressed in words as, an L1 reconstruction error is equal to the sum over image elements i of the absolute value of the difference between the depth of image element i in the input image minus the depth of image element i in the rendered image (rendered from the 3D model $\mathbb{M}$ using pose parameters H).

The L1 reconstruction error may be sensitive to noise in input depth images and to distortions in the 3D model that may arise due to camera-tracking drift during model reconstruction.

The selector may use a reconstruction error which takes into account shape of surfaces in the input and rendered images. For example, by calculating a symmetric chamfer distance on edges detected in the depth frames.

In various examples, the selector may calculate a reconstruction error which takes into account a 3D distance transform. This may be calculated without raycasting, in examples where the 3D model comprises a signed distance transform. Such reconstruction error is a difference in alignment between the camera space observations (input image) and the current model of the surface (i.e. the signed distance transform with the current estimate of the camera pose) and may be expressed as:

$$\Delta_{3DDT}(I,R(H;\mathbb{M}))=\Sigma_i|\mathbb{M}(Hx_i)|$$

Which may be expressed in words as, a reconstruction error calculated in the case where the 3D model is a signed distance transform, is equal to the sum over scene image elements of the magnitude of the signed distance function value at the current scene image element mapped to 3D model $\mathbb{M}$ coordinates using camera pose H.

The selector 122 may select amongst the outputs of the multiple predictors using aggregation and/or clustering. That is, the outputs of the multiple predictors are clustered (across predictors) using k means or any suitable clustering process. Once the outputs are clustered a scoring rule may be used to score the clusters. One of the clusters may be selected on the basis of the scores and the selected cluster used to calculate a single output prediction. For example, by averaging or any other aggregation process.

In an example the clustering is achieved using agglomerative clustering using a distance measure selected from any of: Euclidean distance, angular distance, reconstruction error. The scoring rule may be a voting mechanism with a preference for larger clusters. The scoring rule and the clustering process may use parameters which are tuned using a portion of the training data.

By using aggregation and/or clustering across predictors, as part of the selection process, the effects of noise in the input data are reduced. Where a 3D reconstructed model of a scene or object is used, the use of aggregation and/or clustering as part of the selection process helps ameliorate problems due to missing data or distortions in the model.

Figure 6:
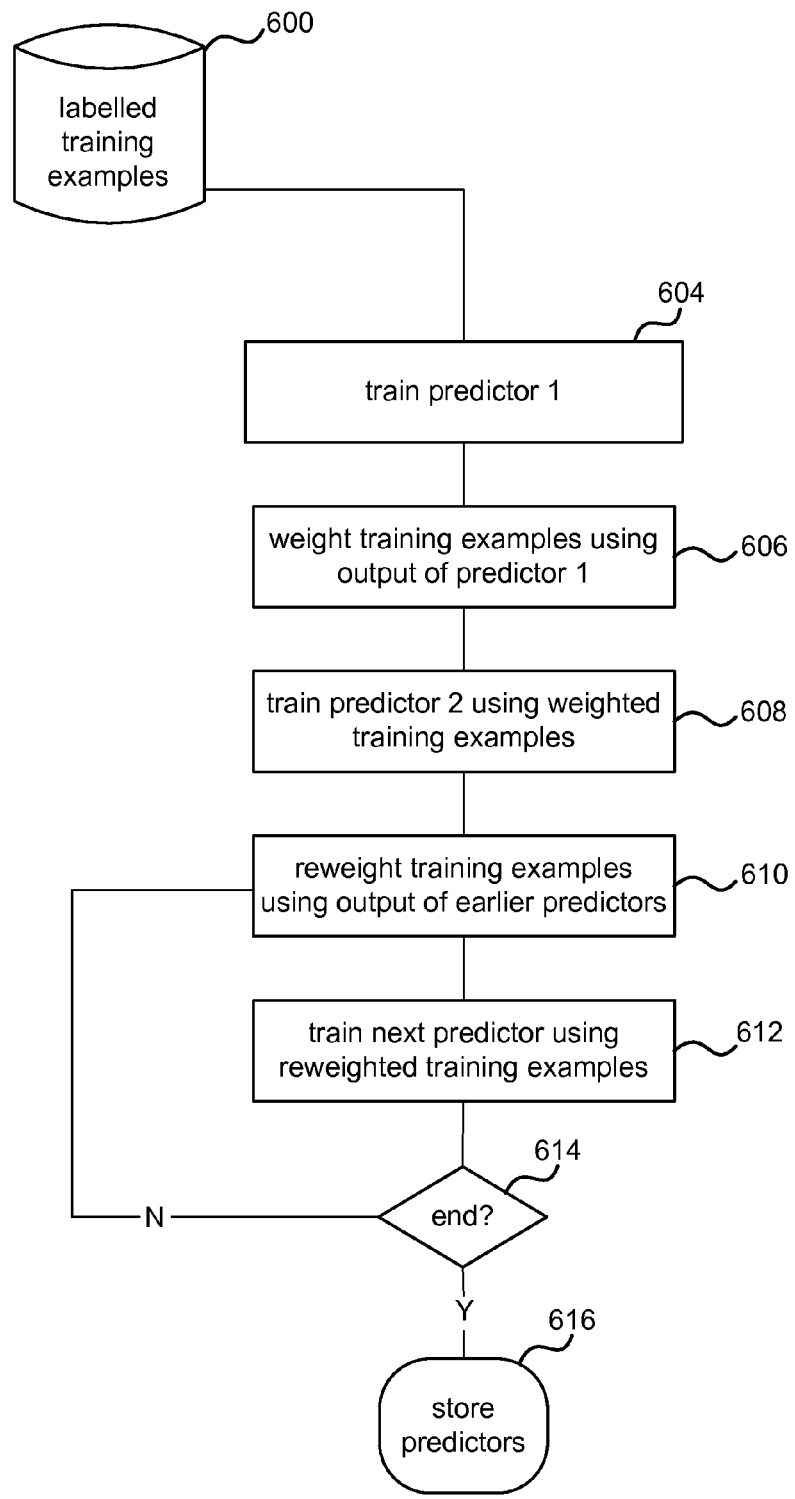
FIG. 6 is a flow diagram of a method of training a plurality of machine learning predictors using reweighting of training examples.

FIG. 6 is a flow diagram of a method for training a plurality of machine learning predictors (such as those of FIG. 1) using reweighting of training examples. Labeled training examples 600 are available according to the particular application domain. A labeled training example is sensor data labeled with ground truth data. For example, in the case of tracking pose of a moving camera the training examples may be depth images of an environment in which the camera is moving and corresponding camera pose data. In the case of tracking pose of an object moving in the field of view of a static camera the training examples may be depth images of the object and corresponding object pose data.

A training engine 1122 (see FIG. 11) has access to the labeled training examples 600. It trains the predictors in series so that a trained predictor in the series may influence how later predictors in the series are trained. For example, a first predictor 604 uses the labeled training examples. The training engine 1122 weights 606 the training examples using the output of predictor 1. For example, training examples for which predictor 1 produces poor results (i.e., predictions dissimilar to ground truth) are given greater weight.

A second predictor is trained 608 using the training examples weighted on the basis of the first predictor. The training examples are then reweighted 610 on the basis of the second predictor's performance (and optionally also the first predictor's performance). A next predictor is trained 612 using the reweighted training examples and the process continues until stopping criteria are met 614 such as when a specified number of predictors are trained. The number of predictors used may be configured on the basis of the application domain. The trained predictors are stored 616.

The labeled training examples 600, together with the trained predictors, may also be used to learn clustering parameters for use by the selector as described in more detail later.

As mentioned above, weights are associated with the training examples. The weights may be related to a task loss l. In the case of camera pose prediction the task loss may be defined as:

$$l_j(\Theta_t;\varepsilon)=l(H_j,f(I;\Theta_t,\varepsilon))$$

Which may be expressed in words as, the task loss for training image j given the set of predictors $\Theta_t$ is equal to the task-loss of (single) prediction $f(I;\Theta_t,\varepsilon)$ with respect to ground-truth $H_j$. Where, $f(I;\Theta_t,\varepsilon)$ is the camera pose hypothesis corresponding to the lowest reconstruction error among the outputs of predictors trained in iterations 1 to t.

In an example the weights are updated on the basis of the task loss. For example, the weights may be updated using the following weight update rule:

$$w_t(j) \leftarrow \frac{w_{t-1}(j)}{z_t}\left(1 - \exp\left\{\frac{-l_j(\Theta_t; \varepsilon)}{\sigma^2}\right\}\right)$$

Which may be expressed in words as, an updated weight for training image j at training iteration t is equal to the previous weight for that training image divided by a normalization factor $Z_t$ and multiplied by one minus the exponent of the negative of the task loss divided by variance parameter $\sigma^2$. The normalization factor is different for each training iteration. The normalization factor ensures that weights are in a predetermined range, such as zero to 1. The above update rule increases or decreases the weight of individual training instances based on the task loss achieved by the set of predictors trained up to the current training iteration.

In various examples the trained regressor 504 of FIG. 5 is a random decision forest or a jungle of directed acyclic graphs (DAGs). More detail about random decision trees and DAGs is now given.

A random decision tree comprises a root node connected to a plurality of leaf nodes via one or more layers of internal split nodes. A random decision tree may be trained to carry out classification, regression or density estimation tasks. For example, to classify examples into a plurality of specified classes, to predict continuous values associated with examples, and to estimate densities of probability distributions from which examples may be generated. During training, examples with associated ground truth labels may be used.

In the case of image processing the examples are image elements of an image. Image elements of an image may be pushed through a trained random decision tree in a process whereby a decision is made at each split node. The decision may be made according to characteristics of the image element and characteristics of test image elements displaced therefrom by spatial offsets specified by parameters at the split node. At a split node the image element proceeds to the next level of the tree down a branch chosen according to the results of the decision. During training, parameter values are learnt for use at the split nodes and data is accumulated at the leaf nodes. For example, distributions of labeled image elements are accumulated at the leaf nodes. Parameters describing the distributions of accumulated leaf node data may be stored and these are referred to as leaf node parameters in this document.

Other types of examples may be used rather than images. For example, phonemes from a speech recognition preprocessing system, or skeletal data produced by a system which estimates skeletal positions of humans or animals from images. In this case test examples are pushed through a trained random decision tree. A decision is made at each split node according to characteristics of the test example and of a split function having parameter values specified at the split node.

The examples may comprise sensor data, such as images, or features calculated from sensor data, such as phonemes or skeletal features. Other types of example may also be used.

An ensemble of random decision trees may be trained and is referred to collectively as a forest. At test time, image elements (or other test examples) are input to the trained forest to find a leaf node of each tree. Data accumulated at those leaf nodes during training may then be accessed and aggregated to give a predicted regression or classification, or density estimation output. By aggregating over an ensemble of random decision trees in this way improved results are obtained.

A directed acyclic graph is a plurality of nodes connected by edges so that there are no loops and with a direction specified for each edge. An example of a directed acyclic graph is a binary tree where some of the internal nodes are merged together. A more formal definition of a DAG specifies criteria for in-degrees and out-degrees of nodes of the graph. An in-degree is the number of edges entering a node. An out-degree is a number of edges leaving a node. In some of the examples described herein rooted DAGs are used. A rooted DAG has one root node with in-degree 0; a plurality of split nodes with in-degree greater than or equal to 1 and out-degree 2; and a plurality of leaf nodes with in-degree greater than or equal to 1. As a result of this topology a DAG comprises multiple paths from the root to each leaf. In contrast a random decision tree comprises only one path to each leaf. A rooted DAG may be trained and used for tasks, such as classification and regression, in a similar way to a random decision tree.

Figure 7:
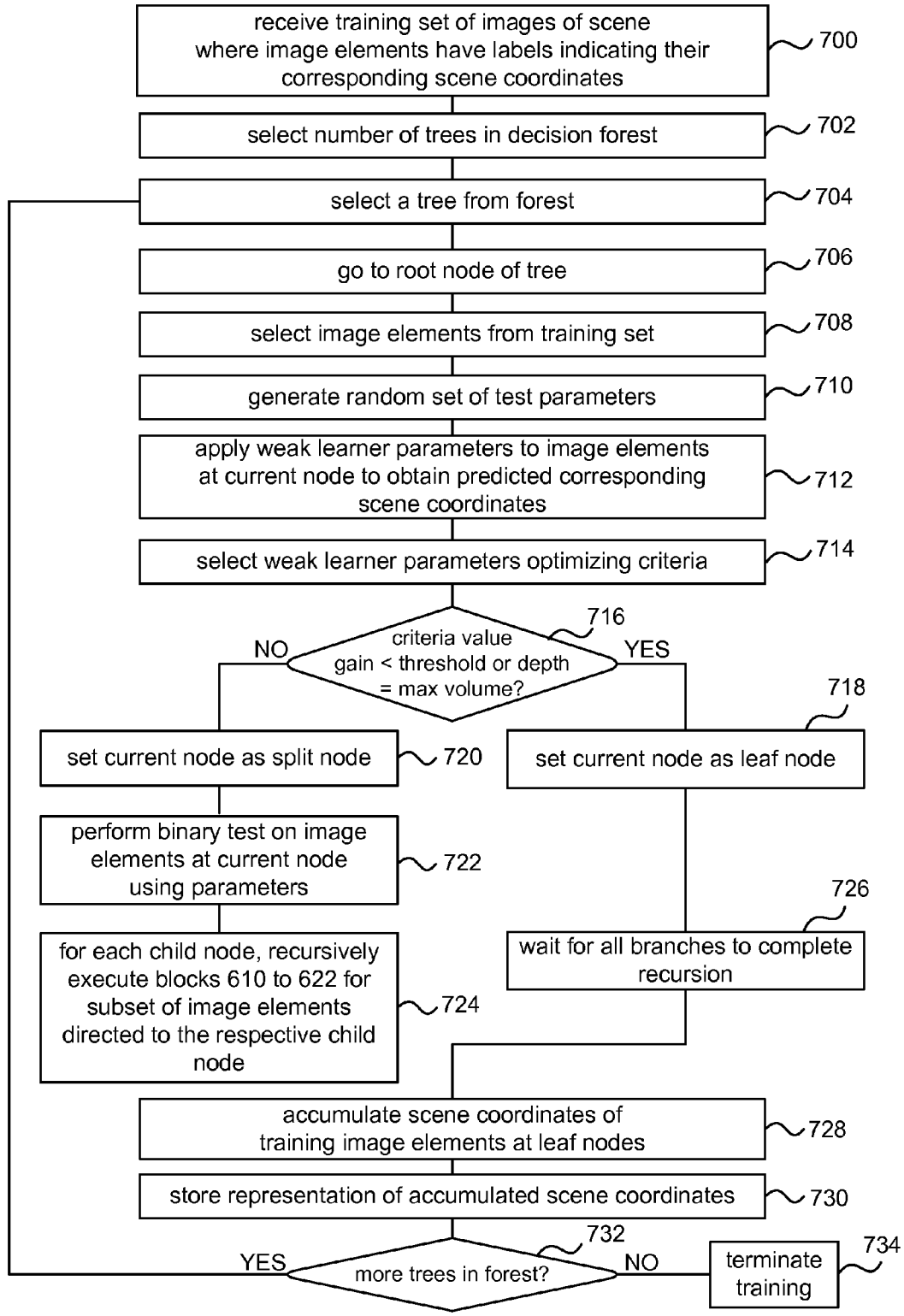
FIG. 7 is a flow diagram of a method of training a random decision forest which may be used as part of the method of FIG. 6.

FIG. 7 is a flow diagram of a method of training a random decision forest which may be used as part of the method of FIG. 6, for the steps that comprise training a predictor. For example, step 608 of FIG. 6 comprises training a second predictor. The method of FIG. 7 is an example of a greedy training process for random decision forests. However, it is also possible to use a non-greedy training process as described in U.S. patent application Ser. No. 14/259,117 filed on 22 Apr. 2014 entitled "Non greedy machine learning for increased accuracy".

The method of FIG. 7 is described with reference to an example where pose of a moving camera is to be tracked. In this example the training data comprises depth images of an environment, also referred to as a scene, in which the camera is moving, where those depth images are labeled with ground truth data. The ground truth data comprises scene coordinates. For example, image elements of the training images have labels indicating their corresponding scene coordinates in world space. A scene coordinate identifies, in world space, a point in the environment. The method of FIG. 7 may also be used for many other application domains and this description with reference to camera pose tracking is not intended to limit the scope of the method.

FIG. 7 is a flow diagram of a method of training a random decision forest using images of a scene where image elements have labels indicating their corresponding scene coordinates. Individual trees in the forest are trained on a discriminative task, which in this example, is to predict scene coordinates given an image of a scene. A training set of images of a scene is received 700 where the image elements have labels indicating the scene coordinate of the scene point they depict. A number of trees to be used in the decision forest is selected 702, for example, between 3 and 20 trees.

A decision tree from the decision forest is selected 704 (e.g. the first decision tree 700) and the root node 706 is selected 706. At least a subset of the image elements from each of the training images are then selected 708. For example, the image may be filtered to remove noisy or spurious image elements. For the second decision tree in the forest onwards, the image elements have weights associated with them as explained above with reference to FIG. 6. For example, the weights are related to how good the previously trained predictors were, on this particular image element, at discriminating between potential scene coordinates.

A random set of test parameters (also called weak learners) are then generated 710 for use by the binary test performed at the root node as candidate features. In one example, the binary test is of the form: $h > f(r: P) > \tau$, such that $f(r: P)$ is a function applied to image element r with parameters P, and with the output of the function compared to threshold values h and $\tau$. If the result of $f(r: P)$ is in the range between h and $\tau$ then the result of the binary test is true. Otherwise, the result of the binary test is false. In other examples, only one of the threshold values h and $\tau$ can be used, such that the result of the binary test is true if the result of $f(r: P)$ is greater than (or alternatively less than) a threshold value. In the example described here, the parameter P defines a feature of the image.

A candidate function $f(r: P)$ makes use of image information which is available at test time. The parameter P for the function $f(r: P)$ is randomly generated during training. The process for generating the parameter P can comprise generating random spatial offset values in the form of a two or three dimensional displacement. The result of the function $f(r: P)$ is then computed by observing the depth (or intensity value in the case of an RGB image and depth image pair) value for one or more test image elements which are displaced from the image element of interest r in the image by spatial offsets. The spatial offsets are optionally made depth invariant by scaling by 1/depth of the image element of interest. Where RGB images are used without depth images the result of the function $f(r: P)$ may be computed by observing the intensity value in a specified one of the red, green or blue color channel for one or more test image elements which are displaced from the image element of interest r in the image by spatial offsets.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter P and the threshold values $h$ and $\tau$. In order to inject randomness into the decision trees, the function parameters P of each split node are optimized only over a randomly sampled subset $\mathcal{P}$ of all possible parameters. This is an effective and simple way of injecting randomness into the trees, and increases generalization.

Then, every combination of test parameter may be applied 712 to each weighted image element in the set of training images. In other words, available values for P are tried one after the other, in combination with available values of h and $\tau$ for each weighted image element in each training image. For each combination, criteria (also referred to as objectives) are calculated 714. The combination of parameters that optimize the criteria (taking into account the weights) is selected 714 and stored at the current node for future use.

In an example the objective is a reduction-in-variance objective expressed as follows:

$$Q(S_n, \langle P, h, \tau \rangle) = V(S_n) - \sum_{d \in \{L,R\}} \frac{|S_n^d(\langle P, h, \tau \rangle)|}{|S_n|} V(S_n^d(\langle P, h, \tau \rangle))$$

Which may be expressed in words as the reduction in variance of the training examples at split node n, with weak learner parameters θ equal to the variance of all the training examples which reach that split node minus the sum of the variances of the training examples which reach the left and right child nodes of the split node. The variance may be calculated as:

$$V(S) = \frac{1}{|S|} \sum_{(p,m,W) \in s} W \times \|m - \overline{m}\|_2^2$$

Which may be expressed in words as, the variance of a set of training examples S equals the average of the differences between the scene coordinates m and the mean of the weighted scene coordinates in S. Where the symbol W is the weight of the example. The mean is also computed using the weights.

As an alternative to a reduction-in-variance objective, other criteria can be used, such as logarithm of the determinant, or the continuous information gain.

It is then determined 716 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 718 as a leaf node. Similarly, the current depth of the tree is determined (i.e. how many levels of nodes are between the root node and the current node). If this is greater than a predefined maximum value, then the current node is set 718 as a leaf node. Each leaf node has scene coordinate predictions which accumulate at that leaf node during the training process as described below.

It is also possible to use another stopping criterion in combination with those already mentioned. For example, to assess the number of example image elements that reach the leaf (weights of the image elements may be taken into account here). If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 720 as a split node. As the current node is a split node, it has child nodes, and the process then moves to training these child nodes. Each child node is trained using a subset of the training image elements at the current node. The subset of image elements sent to a child node is determined using the parameters that optimized the criteria and also taking into account the weights. These parameters are used in the binary test, and the binary test performed 722 on all image elements at the current node. The image elements that pass the binary test form a first subset sent to a first child node, and the image elements that fail the binary test form a second subset sent to a second child node.

For each of the child nodes, the process as outlined in blocks 710 to 722 of FIG. 7 are recursively executed 724 for the subset of image elements directed to the respective child node. In other words, for each child node, new random test parameters are generated 710, applied 712 to the respective subset of image elements, parameters optimizing the criteria selected 714, and the type of node (split or leaf) determined 716. If it is a leaf node, then the current branch of recursion ceases. If it is a split node, binary tests are performed 722 to determine further subsets of image elements and another branch of recursion starts. Therefore, this process recursively moves through the tree, training each node until leaf nodes are reached at each branch. As leaf nodes are reached, the process waits 726 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then scene coordinates may be accumulated 728 at the leaf nodes of the tree. This is the training stage and so particular image elements which reach a given leaf node have specified scene coordinates known from the ground truth training data. A representation of the scene coordinates may be stored 730 using various different methods. For example by aggregating the scene coordinates or storing statistics representing the distribution of scene coordinates.

In some embodiments a multi-modal distribution is fitted to the accumulated scene coordinates. Examples of fitting a multi-model distribution include using expectation maximization (such as fitting a Gaussian mixture model); using mean shift mode detection; using any suitable clustering process such as k-means clustering, agglomerative clustering or other clustering processes. Characteristics of the clusters or multi-modal distributions are then stored rather than storing the individual scene coordinates. In some examples a handful of the samples of the individual scene coordinates may be stored.

A weight may also be stored for each cluster or mode. For example, a mean shift mode detection algorithm is used and the number of scene coordinates that reached a particular mode may be used as a weight for that mode. Mean shift mode detection is an algorithm that efficiently detects the modes (peaks) in a distribution defined by a Parzen window density estimator. In another example, the density as defined by a Parzen window density estimator may be used as a weight. A Parzen window density estimator (also known as a kernel density estimator) is a non-parametric process for estimating a probability density function, in this case of the accumulated scene coordinates. A Parzen window density estimator takes a bandwidth parameter which can be thought of as controlling a degree of smoothing.

In an example a sub-sample of the training image elements that reach a leaf are taken and input to a mean shift mode detection process. This clusters the scene coordinates into a small set of modes. One or more of these modes may be stored for example, according to the number of examples assigned to each mode.

Once the accumulated scene coordinates have been stored it is determined 732 whether more trees are present in the decision forest. If so, then the next tree in the decision forest is selected, and the process repeats. If all the trees in the forest have been trained, and no others remain, then the training process is complete and the process terminates 734.

Therefore, as a result of the training process, one or more decision trees are trained using empirical training images. Each tree comprises a plurality of split nodes storing optimized test parameters, and leaf nodes storing associated scene coordinates or representations of aggregated scene coordinates. Due to the random generation of parameters from a limited subset used at each node, and the possible subsampled set of training data used in each tree, the trees of the forest are distinct (i.e. different) from each other.

The training process may be performed in advance of using the trained prediction system to identify scene coordinates for image elements of depth or RGB images of one or more known scenes. The decision forest and the optimized test parameters may be stored on a storage device for use in identifying scene coordinates of image elements at a later time.

Figure 8:
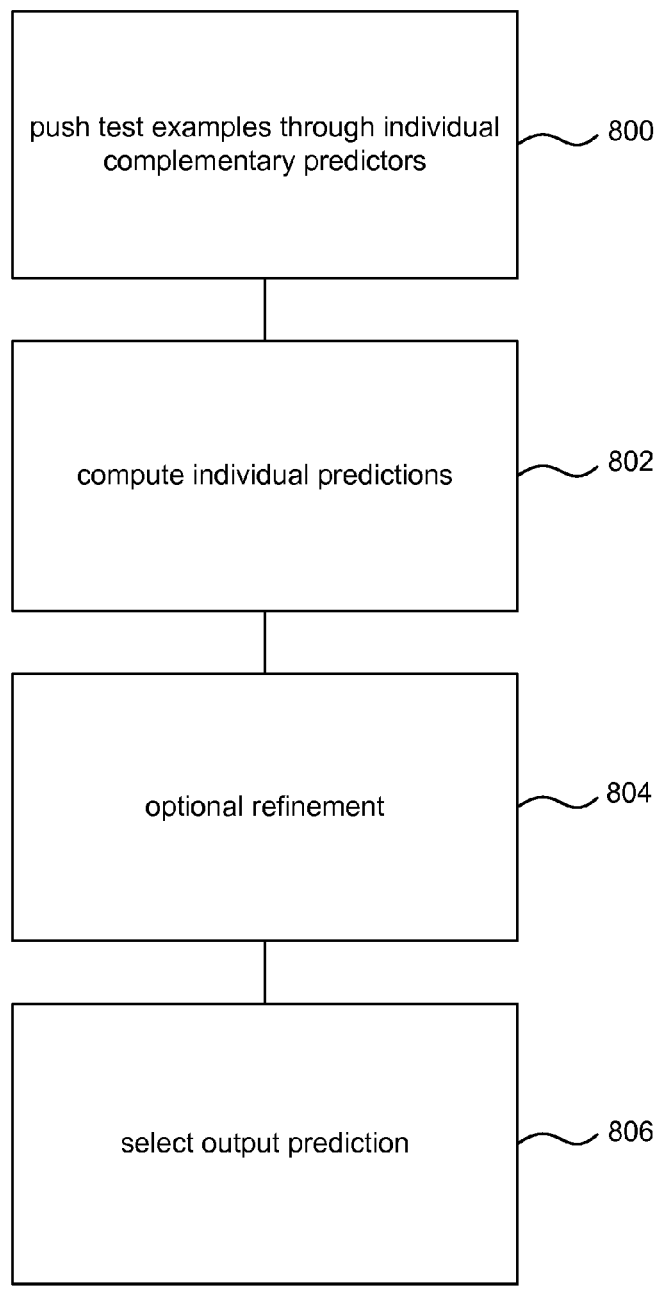
FIG. 8 is a flow diagram of a method of using a plurality of machine learning predictors such as those of FIG. 1, at test time.
Figure 9:
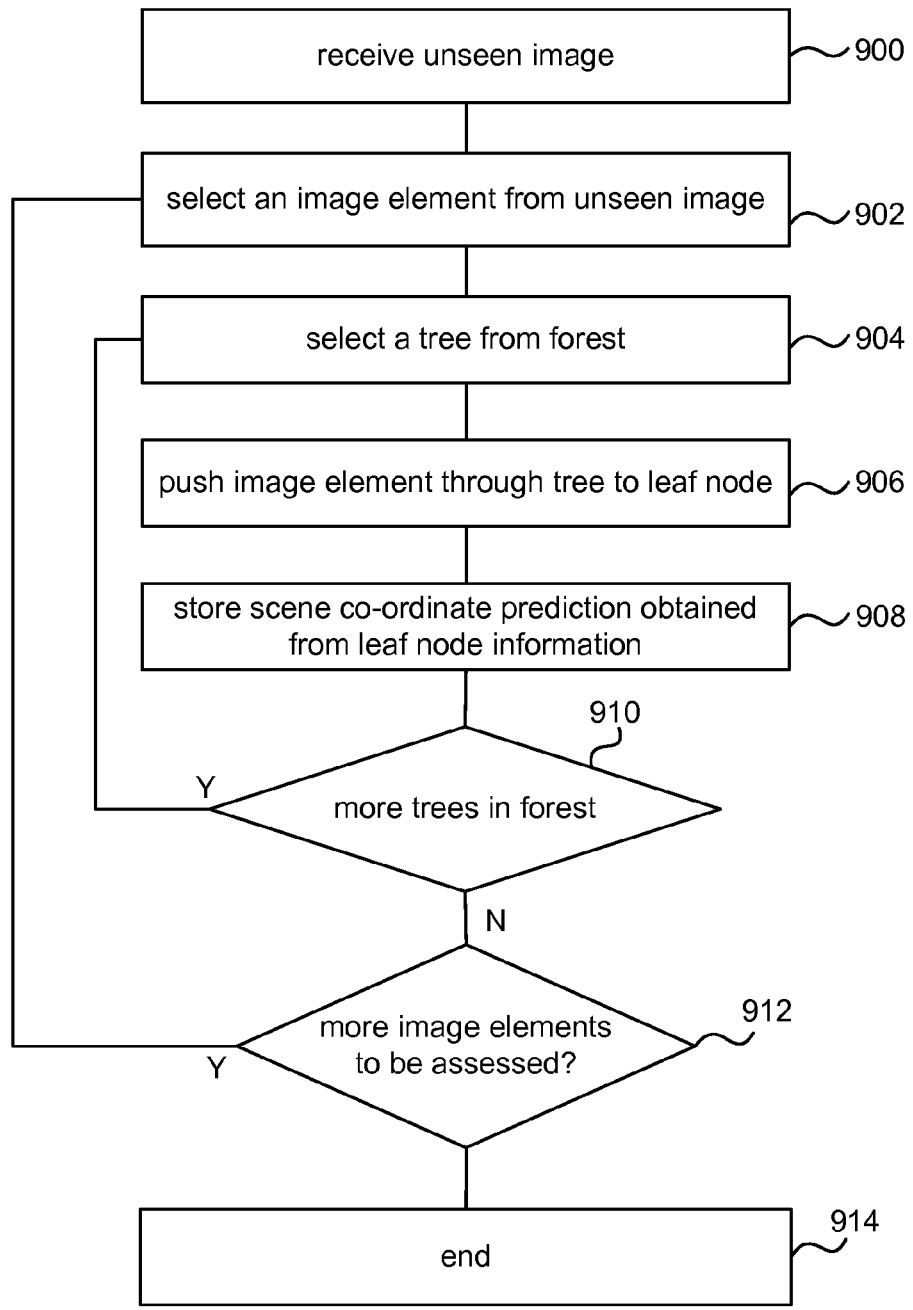
FIG. 9 is a flow diagram of a part of the method of FIG. 8 in more detail in the situation where the machine learning predictors comprise random decision forests.
Figure 10:
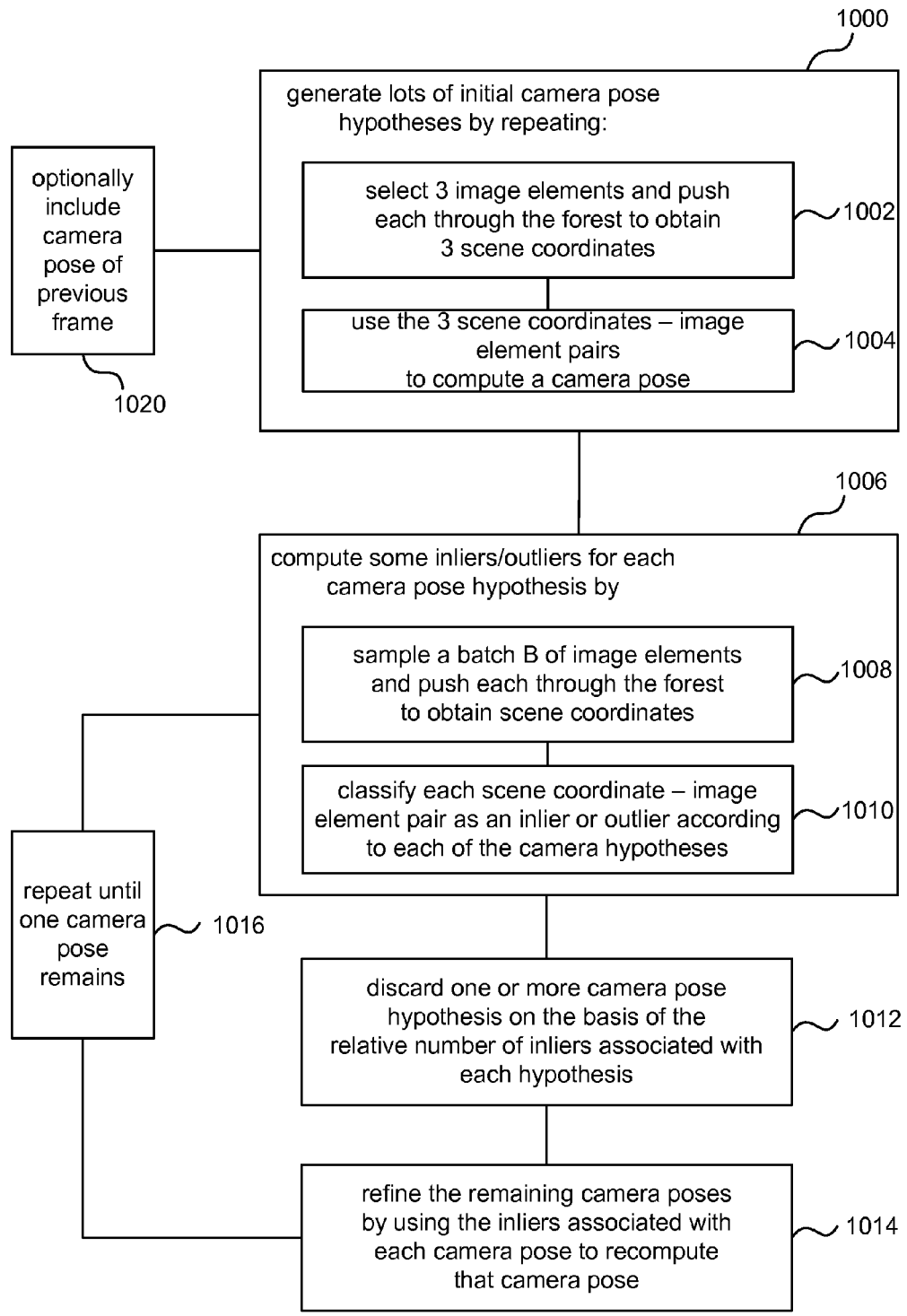
FIG. 10 is a flow diagram of part of the process of FIG. 5 in more detail.

More detail about the test time process, where the multiple predictors are used to make predictions, is now given with reference to FIGS. 8 to 10.

FIG. 8 is a flow diagram of a method of using a plurality of machine learning predictors such as those of FIG. 1, at test time. Test examples, such as portions of an audio signal, image elements of an image, or other examples which were not used during training, are pushed 800 through each of the individual complementary predictors. This gives many predictions from each predictor. In some examples, outputs of a given individual predictor may be used as starting points for an optimization process to calculate single predictions 802 associated with each predictor. The single predictions are optionally refined 804 and a selector is used to select 806 an output prediction as described above.

In an example where the individual predictors are trained random decision forests or DAGs, trained using reweighting of training examples as described above, the method of FIG. 9 may be used to push test examples through the predictor. FIG. 9 is described for the situation where the task is tracking pose of a camera or an object/entity. However, FIG. 9 is also applicable for other tasks such as the audio example described with reference to FIG. 1.

FIG. 9 illustrates a flowchart of a process for predicting scene coordinates in a previously unseen image (a depth image, an RGB image, or a pair of rectified depth and RGB images) using a decision forest that has been trained as described with reference to FIGS. 6 and 7. Firstly, an unseen image is received 900. An image is referred to as 'unseen' to distinguish it from a training image which has the scene coordinates already specified.

An image element from the unseen image is selected 902. A trained decision tree from the decision forest is also selected 904. The selected image element is pushed 906 through the selected decision tree, such that it is tested against the trained parameters at a node, and then passed to the appropriate child in dependence on the outcome of the test, and the process repeated until the image element reaches a leaf node. Once the image element reaches a leaf node, the accumulated scene coordinates (from the training stage) associated with this leaf node are stored 908 for this image element. In an example where the leaf node stores one or more modes of a distribution of scene coordinates, one or more of those modes are stored for this image element.

If it is determined 910 that there are more decision trees in the forest, then a new decision tree is selected 904, the image element pushed 906 through the tree and the accumulated scene coordinates stored 908. This is repeated until it has been performed for all the decision trees in the forest. The final prediction of the forest for an image element may be an aggregate of the scene coordinates obtained from the leaf found at each tree. Where one or more modes of a distribution of scene coordinates are stored at the leaves, the final prediction of the forest may be a union of the modes from the leaf found at each tree. Note that the process for pushing an image element through the plurality of trees in the decision forest can also be performed in parallel, instead of in sequence as shown in FIG. 9.

It is then determined 912 whether further unanalyzed image elements are to be assessed, and if so another image element is selected and the process repeated. Otherwise the process ends 914.

In some examples an optimizer (see 120 of FIG. 1) is used and this takes the predictions of the multiple predictors as starting points for optimization. FIG. 10 is a flow diagram of a method at optimizer 120 in the case where the task is tracking pose of a camera or tracking pose of an object/entity. In this example, the optimizer uses scene-coordinate-image element pairs to infer pose. An energy optimization approach is used by the optimizer to find a camera/object pose which is a good fit to a plurality of image elements—scene coordinate pairs predicted by the scene coordinate decision forest. In the case that depth images, or both depth and RGB images are used, an example energy function may be:

$$E(H) = \Sigma_{i \in I} \rho(\min_{m \in \mathcal{M}_i} \|m - H x_i\|_2) = \Sigma_{i \in I} e_i(H)$$

Where $i \in I$ is an image element index; $\rho$ is a robust error function; $m \in \mathcal{M}_i$ represents the set of modes (3D locations in the scene's world space) predicted by the trees in the forest at image element $p_i$; and $x_i$ are the 3D coordinates in camera space corresponding to pixel $p_i$ which may be obtained by back-projecting the depth image elements. The energy function may be considered as counting the number of outliers for a given pose hypothesis H. The above notation uses homogeneous 3D coordinates.

In the case that RGB images are used without depth images the energy function may be modified by $$E(H) = \Sigma_{i \in I} \rho(\min_{m \in \mathcal{M}_i} \|\pi(KH^{-1} m - p_i)\|_2) = \Sigma_{i \in I} e_i(H)$$

where $\rho$ is a robust error function, $\pi$ projects from 3D to 2D image coordinates, K is a matrix that encodes the camera intrinsic parameters, and $p_i$ is the 2D image element coordinate.

Note that E, $\rho$ and $e_i$ may be separated out with different superscripts such as rgb/depth in the above equations.

In order to optimize the energy function an iterative process may be used to search for good pose candidates amongst a set of possible pose candidates. Samples of image element-scene coordinate pairs are taken and used to assess the pose candidates. The pose candidates may be refined or updated using a subset of the image element-scene coordinate pairs. By using samples of image element-scene coordinate pairs rather than each image element-scene coordinate pair from an image computation time is reduced without loss of accuracy.

An example iterative process which may be used at the optimizer is now described with reference to FIG. 10. A set of initial pose candidates or hypotheses is generated 800 by, for each pose candidate, selecting 1002 three image elements from the input image (which may be a depth image, an RGB image or a pair of rectified depth and RGB images). The selection may be random or may take into account noise or missing values in the input image. It is also possible to pick pairs where the scene coordinate is more certain where certainty information is available from the forest. In some examples a minimum distance separation between the image elements may be enforced in order to improve accuracy. Each image element is pushed through the trained scene coordinate decision forest to obtain three scene coordinates. The three image element-scene coordinate pairs are used to compute 1004 a pose using any suitable method such as the Kabsch algorithm also known as orthogonal Procrustes alignment which uses a singular value decomposition to compute the pose hypothesis. In some examples the set of initial pose candidates may include 1020 one or more poses of previous frames where a stream of images is available. It may also include a pose predicted from knowledge of the camera's path, or path of the object/entity.

For each pose hypothesis some inliers or outliers are computed 1006. Inliers and outliers are image element-scene coordinate pairs which are classified as either being consistent with a pose hypothesis or not. To compute inliers and outliers a batch B of image elements is sampled 1008 from the input image and applied to the trained forest to obtain scene coordinates. The sampling may be random or may take into account noise or missing values in the input image. Each scene coordinate-image element pair may be classified 1010 as an inlier or an outlier according to each of the pose hypotheses. For example, by comparing what the forest says the scene coordinate is for the image element and what the pose hypothesis says the scene coordinate is for the image element.

Optionally, one or more of the pose hypotheses may be discarded 1012 on the basis of the relative number of inliers (or outliers) associated with each hypothesis, or on the basis of a rank ordering by outlier count with the other hypotheses. In various examples the ranking or selecting hypotheses may be achieved by counting how many outliers each camera pose hypothesis has. Pose hypotheses with fewer outliers have a higher energy according to the energy function above.

Optionally, the remaining pose hypotheses may be refined 1014 by using the inliers associated with each pose to recompute that pose (using the Kabsch algorithm mentioned above). For efficiency the process may store and update the means and covariance matrices used by the singular value decomposition.

The process may repeat 1016 by sampling another batch B of image elements and so on until one or a specified number of poses remains or according to other criteria (such as the number of iterations).

Figure 11:
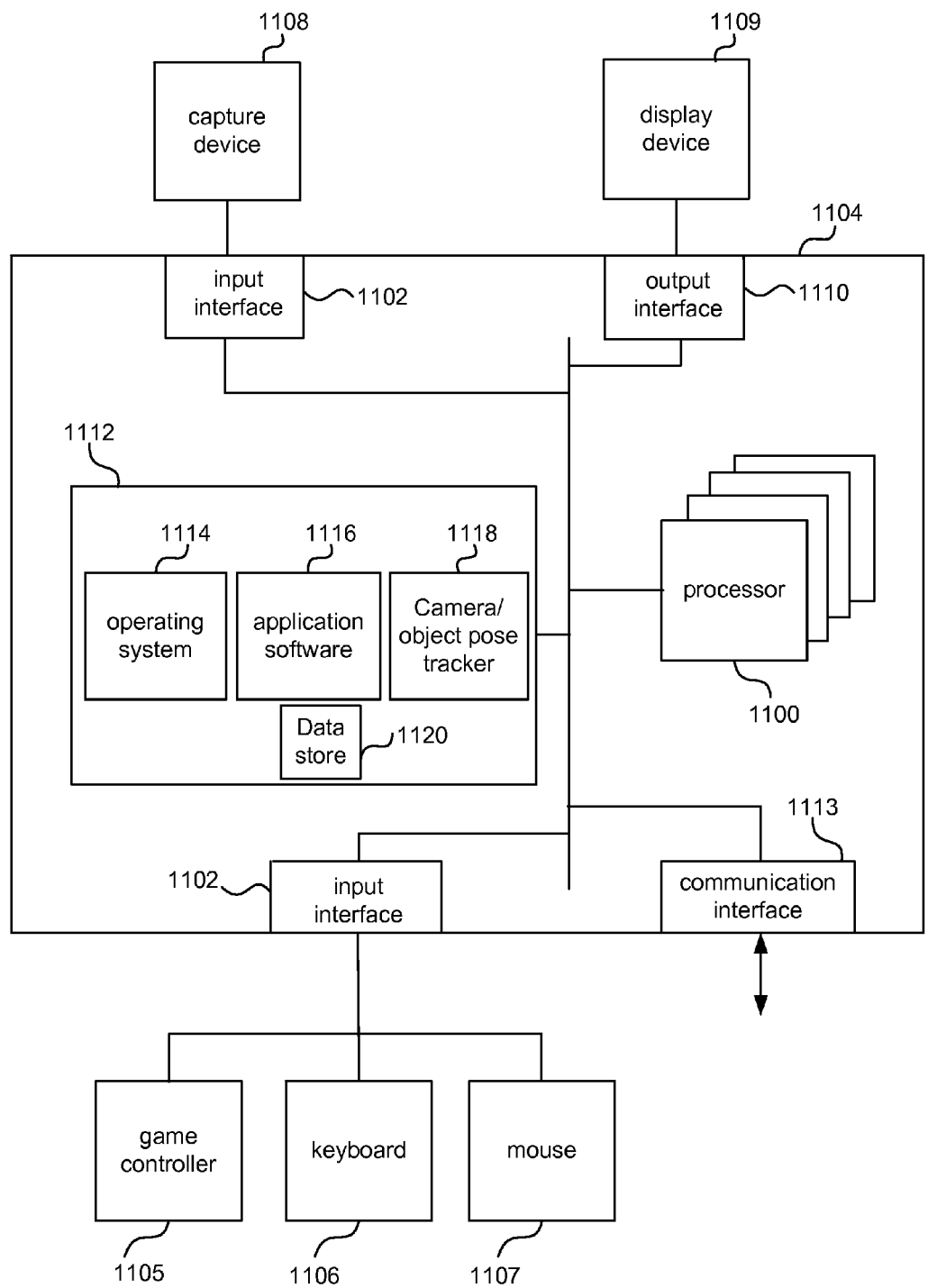
FIG. 11 illustrates an exemplary computing-based device in which embodiments of a system for tracking using sensor data may be implemented.

FIG. 11 illustrates various components of an exemplary computing-based device 1104 which may be implemented as any form of a computing and/or electronic device, and in which embodiments of a sensor data tracker such as a camera pose tracker or object pose tracker may be implemented.

The computing-based device 1104 comprises one or more input interfaces 1102 arranged to receive and process input from one or more devices, such as user input devices (e.g. capture device 1108, a game controller 1105, a keyboard 1106, a mouse 1107). This user input may be used to control software applications, sensor data tracking, machine learning predictor training, camera pose tracking or object pose tracking. For example, capture device 1108 may be a mobile depth camera arranged to capture depth maps of a scene. It may also be a fixed depth camera arranged to capture depth maps of an object. In another example, capture device 1108 comprises both a depth camera and an RGB camera. In another example the capture device 1108 is an RGB camera. The computing-based device 1104 may be arranged to provide sensor data tracking such as camera or object pose tracking at interactive rates.

The computing-based device 1104 also comprises an output interface 1110 arranged to output display information to a display device 1109 which can be separate from or integral to the computing device 1104. The display information may provide a graphical user interface. In an example, the display device 1109 may also act as the user input device if it is a touch sensitive display device. The output interface 1110 may also output data to devices other than the display device, e.g. a locally connected printing device.

In some examples the user input devices 1105, 1107, 1108, 1109 may detect voice input, user gestures or other user actions and may provide a natural user interface (NUI). This user input may be used to control a game or other application. The input interface 1102, output interface 1110, display device 1109 and optionally the user input devices 1105, 1107, 1108, 1109 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Computer executable instructions may be provided using any computer-readable media that is accessible by computing based device 1104. Computer-readable media may include, for example, computer storage media such as memory 1112 and communications media. Computer storage media, such as memory 1112, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1112) is shown within the computing-based device 1104 it will be appreciated that the storage may be distributed or located remotely and accessed via a network or other communication link (e.g. using communication interface 1113).

Computing-based device 1104 also comprises one or more processors 1000 which may be microprocessors, controllers or any other suitable type of processors for processing computing executable instructions to control the operation of the device in order to provide real-time sensor data tracking. In some examples, for example where a system on a chip architecture is used, the processors 1100 may include one or more fixed function blocks (also referred to as accelerators) which implement a part of the method of real-time camera tracking in hardware (rather than software or firmware).

Platform software comprising an operating system 1114 or any other suitable platform software may be provided at the computing-based device to enable application software 1116 to be executed on the device. Other software that may be executed on the computing device 1104 comprises: sensor data tracker 1118. A training engine 1122 is optionally included for examples where the sensor data tracker is to be trained as described herein. A data store 1120 is provided to store data such as previously received sensor data, images, camera pose estimates, object pose estimates, trained random decision forests, user configurable parameters, other parameters, 3D models of scenes, game state information, game metadata, map data and other data.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
receiving empirical sensor data from a capture device;
applying portions of the sensor data to a plurality of trained machine learning systems to calculate a plurality of diverse predictions of parameters of a process describing how the sensor data is generated;
selecting at least one prediction from among the plurality of diverse predictions on the basis of a reconstruction error, where the reconstruction error for each prediction is calculated by generating a signal using the prediction and the process, and calculating a distance between the generated signal and sensor data; and
outputting the selected prediction to a system for controlling a computing device using the selected prediction and the process.

2. The method of claim 1 comprising receiving a stream of the empirical sensor data from the capture device and outputting a stream of selected predictions at a rate similar to a rate of the stream.

3. The method of claim 1 comprising applying the portions of the sensor data to the plurality of trained machine learning systems in parallel.

4. The method of claim 1 wherein the diverse predictions are dispersed over a space of possible predictions.

5. The method of claim 1 where the trained machine learning systems have been trained to carry out a discriminative task such that the lowest error achieved by one of the trained machine learning systems on a given sensor data portion is minimized.

6. The method of claim 5 where the trained machine learning systems have also been trained to produce outputs which are different.

7. The method of claim 1 where the trained machine learning systems have been trained in series such that training outcomes of machine learning systems trained earlier in the series influence training of machine learning systems trained later in the series.

8. The method of claim 1 where the trained machine learning systems have been trained by calculating a loss of a discriminative task on training data, and using the calculated loss to weight the training data.

9. The method of claim 1 comprising using the plurality of diverse predictions as starting points of an optimization process.

10. The method of claim 1 wherein the reconstruction error takes into account a 3D model of a scene or object.

11. The method of claim 1 comprising selecting the at least one prediction by calculating clusters of the predictions.

12. The method of claim 1 wherein the machine learning systems are regressors.

13. The method of claim 1 wherein the empirical sensor data comprises an image and wherein the process is a rendering process describing how the image is generated from a 3D model given a pose, in world coordinates, of a camera or of an object.

14. A computer-implemented method comprising:
receiving empirical sensor data from a capture device,
applying portions of the sensor data to a plurality of machine learning systems to calculate a plurality of diverse predictions of parameters of a process describing how the sensor data is generated;
accessing, at a processor, training data comprising a plurality of examples, the plurality of diverse predictions, and associated ground truth data; and
training, in series, the plurality of machine learning systems using the training data by weighting the training data on the basis of performance of the examples such that training outcomes of machine learning systems trained earlier in the series influence training of machine learning systems trained later in the series, wherein the training the plurality of machine learning systems includes calculating a loss of a discriminative task on the training data, and using the calculated loss to weight the training data.

15. The method of claim 14 further comprising training at least one machine learning system of the plurality of machine learning systems to carry out a discriminative task such that the lowest error achieved by one of the trained machine learning systems on a given sensor data portion is minimized.

16. A computer-implemented tracker comprising:
an input interface receiving empirical sensor data;
a plurality of trained machine learning systems including at least one processor and a memory device that are trained to produce outputs that comprise at least a first output that is different from a second output, the plurality of trained machine learning systems configured to calculate, based at least in part on portions of the sensor data, a plurality of diverse predictions of parameters of a process describing how the sensor data is generated, wherein the plurality of trained machine learning systems are further trained to carry out a discriminative task such that the lowest error achieved by one of the plurality of trained machine learning systems on a given empirical sensor data portion is minimized; and a selector which selects at least one of the predictions and outputs the selected prediction to a system for controlling a computing device using the selected prediction and the process.

17. The tracker of claim 16 comprising a parallel computing unit having the plurality of trained machine learning systems.

18. The tracker of claim 16 wherein the capture device comprises a camera and the selected prediction comprises parameters of pose, in world coordinates, of an object or a camera.

19. The tracker of claim 16 wherein the machine learning systems are trained regressors.

20. The tracker of claim 16 the trained machine learning systems being at least partially implemented using hardware logic selected from any one or more of:
- a field-programmable gate array,
- a program-specific integrated circuit,
- a program specific standard product,
- a system-on-a-chip, a complex programmable logic device,
- a graphics processing unit.

* * * * *